(12) United States Patent
Zhang et al.

(10) Patent No.: US 12,130,463 B2
(45) Date of Patent: Oct. 29, 2024

(54) BACKLIGHT MODULE AND DISPLAY DEVICE

(71) Applicants: Beijing BOE Display Technology Co., Ltd., Beijing (CN); BOE Technology Group Co., Ltd., Beijing (CN)

(72) Inventors: Zhipeng Zhang, Beijing (CN); Dong Cui, Beijing (CN); Weining Chi, Beijing (CN); Yongle Qi, Beijing (CN); Shouyang Leng, Beijing (CN); Fengping Wang, Beijing (CN); Qing Ma, Beijing (CN); Daekeun Yoon, Beijing (CN); Wenyang Li, Beijing (CN); Yue Zhai, Beijing (CN); Yuanyuan Zhu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/022,673

(22) PCT Filed: Mar. 25, 2022

(86) PCT No.: PCT/CN2022/083143
§ 371 (c)(1),
(2) Date: Feb. 22, 2023

(87) PCT Pub. No.: WO2023/178674
PCT Pub. Date: Sep. 28, 2023

(65) Prior Publication Data
US 2024/0272345 A1 Aug. 15, 2024

(51) Int. Cl.
*F21V 8/00* (2006.01)

(52) U.S. Cl.
CPC ......... *G02B 6/0038* (2013.01); *G02B 6/0016* (2013.01); *G02B 6/0076* (2013.01)

(58) Field of Classification Search
None
See application file for complete search history.

(56) References Cited

U.S. PATENT DOCUMENTS

| | | | |
|---|---|---|---|
| 2017/0261672 A1 | 9/2017 | Liu et al. | |
| 2020/0019018 A1 | 1/2020 | Xu | |
| 2023/0177866 A1* | 6/2023 | Feng | H01L 27/14678 382/124 |

FOREIGN PATENT DOCUMENTS

| | | |
|---|---|---|
| CN | 206057756 U | 3/2017 |
| CN | 107179627 A | 9/2017 |

(Continued)

*Primary Examiner* — Ashok Patel
(74) *Attorney, Agent, or Firm* — IPro, PLLC

(57) ABSTRACT

Provided in the present disclosure are a backlight module and a display device. The backlight module includes: a first light guide plate, including: a first surface, a second surface, and a first side surface, where the second surface includes a plurality of first mesh points arranged in arrays; at least one first light source, adjacent to the first side surface; a first reverse prism, located on a side of the first surface away from the second surface; a first privacy filter, located on a side of the first reverse prism away from the first light guide plate; a second light guide plate, located on a side of the first privacy filter away from the first reverse prism, and including: a third surface and a fourth surface that are opposite, and a second side surface connecting the third surface and the fourth surface.

20 Claims, 5 Drawing Sheets

(56) References Cited

FOREIGN PATENT DOCUMENTS

| | | | |
|---|---|---|---|
| CN | 209433052 | U | 9/2019 |
| CN | 111856819 | A | 10/2020 |
| CN | 112835216 | A | 5/2021 |
| CN | 113556532 | A | 10/2021 |
| CN | 215340417 | U | 12/2021 |
| CN | 114049866 | A | 2/2022 |
| CN | 114930206 | * | 8/2022 |
| WO | 2017065745 | A1 | 4/2017 |

* cited by examiner

BACKLIGHT MODULE AND DISPLAY DEVICE

CROSS REFERENCE TO RELATED APPLICATIONS

The present disclosure is a US National Stage of International Application No. PCT/CN2022/083143, filed on Mar. 25, 2022, the entire contents of which are incorporated herein by reference.

FIELD

The present disclosure relates to the field of display technologies, and in particular to a backlight module and a display device.

BACKGROUND

With the development of society, people have demand for display products in an increasingly wide range of application scenarios, and the demand for in-vehicle display is increasingly high.

Current in-vehicle display products include, for example, a display system in front of a driver, a center control display system, a passenger display system, and the like. To avoid affecting the safety of vehicle driving, in-vehicle display products usually need to implement switching between a privacy filtering state and a sharing state. For example, for a passenger display system, the privacy filtering state needs to keep a driver user from watching a display screen. However, a privacy filtering state of in-car display in existing technologies has inadequate privacy filtering.

SUMMARY

An embodiment of the present disclosure provides a backlight module. The backlight module includes: a first light guide plate, including: a first surface and a second surface that are opposite, and a first side surface connecting the first surface and the second surface, where the second surface includes a plurality of first mesh points arranged in arrays; at least one first light source, adjacent to the first side surface; a first reverse prism, located on a side of the first surface away from the second surface; a first privacy filter, located on a side of the first reverse prism away from the first light guide plate, where the first privacy filter has a first privacy filtering direction, and the first privacy filter is used to block light at a preset angle in the first privacy filtering direction for collimated incident light; a second light guide plate, located on a side of the first privacy filter away from the first reverse prism, and including: a third surface and a fourth surface that are opposite, and a second side surface connecting the third surface and the fourth surface, where the third surface is located on a side of the fourth surface away from the first privacy filter, and the fourth surface includes a plurality of second mesh points arranged in arrays; and at least one second light source, adjacent to the second side surface.

In some embodiments, the backlight module further includes: a viewing angle control module, located on a side of the second light guide plate away from the first privacy filter; and a first driving circuit, electrically connected to the viewing angle control module, and used to: provide an electric signal to the viewing angle control module, to enable a propagation direction of light that exits after passing through the viewing angle control module to change.

In some embodiments, the viewing angle control module includes: a first conductive layer, a first liquid crystal layer, and a second conductive layer that are stacked.

In some embodiments, the third surface includes a plurality of continuously arranged prism structures.

In some embodiments, the backlight module further includes: a semi-transparent and semi-reflective film, located between the first privacy filter and the second light guide plate.

In some embodiments, the semi-transparent and semi-reflective film is a polarizer film.

In some embodiments, the backlight module further includes: a second privacy filter located on the side of the second light guide plate away from the first privacy filter, where the second privacy filter has a second privacy filtering direction, and the second privacy filtering direction and the first privacy filtering direction intersect.

In some embodiments, the plurality of second mesh points are arranged in arrays in a first direction and a second direction; the first direction and the second direction intersect; and a shape of each second mesh point is a circle or an ellipse.

In some embodiments, a width of the second light guide plate in the first direction is larger than a width of the second light guide plate in the second direction; and the at least one second light source is adjacent to the second side surface in the second direction.

In some embodiments, the plurality of second mesh points are arranged in arrays in a first direction and a second direction; the first direction and the second direction intersect; and a shape of each second mesh point is a wedge; and the backlight module further includes: a second reverse prism located on the side of the second light guide plate away from the first privacy filter.

In some embodiments, the first privacy filtering direction is the second direction; a width of the second light guide plate in the first direction is larger than a width of the second light guide plate in the second direction; and the at least one second light source is adjacent to the second side surface in the second direction.

In some embodiments, a cross-sectional pattern of the second mesh point in the first direction is an isosceles trapezoid; and a cross-sectional pattern of the second mesh point in the second direction is a non-right non-isosceles triangle.

In some embodiments, a shape of each first mesh point is a wedge.

In some embodiments, the first light source and the second light source are located on a same side of the first light guide plate, or the first light source and the second light source are respectively located on two sides of the first light guide plate.

In some embodiments, the backlight module further includes: a reflective sheet, located on a side of the second surface away from the first surface.

An embodiment of the present disclosure provides a display device. The display device includes: the backlight module provided in the foregoing embodiment of the present disclosure; and a display panel, located on a light exit side of the backlight module.

BRIEF DESCRIPTION OF THE DRAWINGS

To describe the technical solutions of the embodiments of the present disclosure more clearly, the following briefly describes the accompanying drawings required for describing the embodiments. Apparently, the accompanying draw

DETAILED DESCRIPTION OF THE EMBODIMENTS

To make the objectives, technical solutions, and advantages of the embodiments of the present disclosure clearer, the following clearly and completely describes the technical solutions in embodiments of the present disclosure with reference to the accompanying drawings in embodiments of the present disclosure. Apparently, the described embodiments are some rather than all of the embodiments of the present disclosure. The embodiments in the present disclosure and the features in the embodiments can be combined with each other without causing a conflict. All other embodiments obtained by persons of ordinary skill in the art based on the described embodiments of the present disclosure without creative efforts shall fall within the protection scope of the present disclosure.

Unless otherwise defined, the technical terms and scientific terms used in the present disclosure have the same meaning as how they are generally understood by those of ordinary skill in the art to which the present disclosure pertains. Terms such as "first" and "second" used in the present disclosure are only used to distinguish different components and do not intend to indicate any order, number or importance. Similar terms such as "comprise" or "include" means that an element or object in front of the term covers elements or objects listed behind the term but do not exclude other elements or objects. Terms such as "connection" or "connected" are not limited to a physical or mechanical connection, and may include an electrical connection, which may be a direct electrical connection or an indirect electrical connection.

It should be noted that the size and shape of the figures in the accompanying drawings do not reflect true scale and are intended to describe the content of the present disclosure only schematically. In addition, the same or similar numerals represent the same or similar elements or elements having the same or similar functions throughout the specification.

Figure 1:
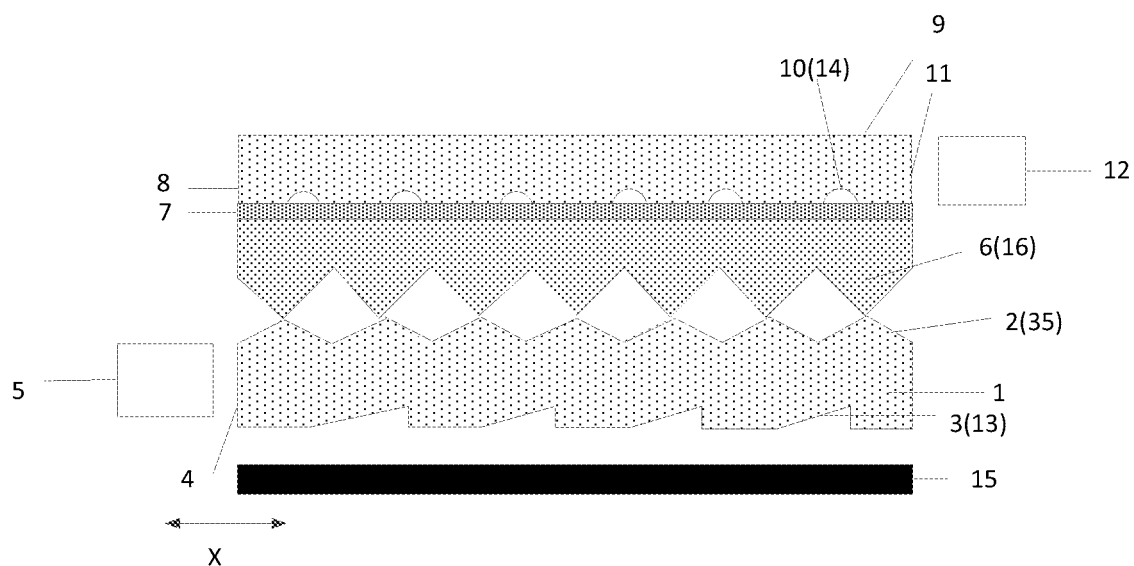
- FIG. 1 is a schematic structural diagram of a backlight module according to an embodiment of the present disclosure.

An embodiment of the present disclosure provides a backlight module. As shown in FIG. 1, the backlight module includes:

a first light guide plate 1, including: a first surface 2 and a second surface 3 that are opposite, and a first side surface 4 connecting the first surface 2 and the second surface 3, where the second surface 3 includes a plurality of first mesh points 13 arranged in arrays;

at least one first light source 5, adjacent to the first side surface 4;

a first reverse prism 6, located on a side of the first surface 2 away from the second surface 3;

a first privacy filter 7, located on a side of the first reverse prism 6 away from the first light guide plate 1, where the first privacy filter 7 has a first privacy filtering direction, and the first privacy filter 7 is used to block light at a preset angle in the first privacy filtering direction for collimated incident light;

a second light guide plate 8, located on a side of the first privacy filter 7 away from the first reverse prism 6, and including: a third surface 9 and a fourth surface 10 that are opposite, and a second side surface 11 connecting the third surface 9 and the fourth surface 10, where the third surface 9 is located on a side of the fourth surface 10 away from the first privacy filter 7, and the fourth surface 10 includes a plurality of second mesh points 14 arranged in arrays; and at least one second light source 12, adjacent to the second side surface 11.

In the backlight module provided in the embodiments of the present disclosure, the first reverse prism is located on a light exit surface of the first light guide plate, so that outgoing light of the first light guide plate may be converged to form collimated outgoing light. The first privacy filter is disposed on the side of the first reverse prism away from the first light guide plate. After collimated light enters the first privacy filter, the first privacy filter may block light at the preset angle in the first privacy filtering direction, thereby further narrowing down an angle of outgoing light. When the backlight module is applied to a display product, a user cannot view a display screen in a viewing area corresponding to the preset angle. The display product can implement privacy filtering in the first privacy filtering direction, and can improve a privacy filtering effect. In addition, because the first reverse prism may converge light that exits the first light guide plate, the light emission brightness in a vertical viewing angle can be further improved, thereby reducing a loss in light emission brightness due to the arrangement of the first privacy filter, and avoiding an increase in the power consumption of the backlight module. In addition, in the backlight module provided in the embodiments of the present disclosure, the second light source and the second light guide plate are combined, so that light emitted by the second light source can pass through the second light guide plate to exit at a large exit angle. When the backlight module is applied to a display product, a viewable area of the display product has a large angle, so that several people can view a display screen together, that is, a sharing state is implemented. That is, the backlight module provided in the embodiments of the present disclosure may implement switching between a privacy filtering state and a sharing state.

It should be noted that when the backlight module provided in the embodiments of the present disclosure is applied to a display product that can implement switching between a privacy filtering state and a sharing state, in the privacy filtering state, the first light source is turned on, and the second light source is turned off; in the sharing state, the second light source is turned on, and the first light source is turned off, or both the second light source and the first light source may be turned on. For the sharing state, when the first light source is turned off, the power consumption can be reduced, and when the first light source is turned on, the brightness of the backlight module can be improved. During specific implementation, it may be chosen according to a brightness requirement to turn off or turn on the first light source. If the brightness requirement of the backlight module can be satisfied when the first light source is turned off, the first light source is turned off to reduce the power consumption, or otherwise the first light source is turned on.

It should be noted that the first privacy filter blocks light at the preset angle in the first privacy filtering direction, and the preset angle may be set according to a privacy filtering angle required for the backlight module.

In some embodiments, as shown in FIG. 1, the backlight module further includes: a reflective sheet 15, located on a side of the second surface 3 away from the first surface 2.

The backlight module provided in the embodiments of the present disclosure includes the reflective sheet, so that the utilization of light of the backlight module can be improved.

In some embodiments, the backlight module further includes: a frame. The film layers, such as light sources, light guide plates, reverse prisms, and privacy filters, included in the backlight module may be installed on the frame.

Figure 2:
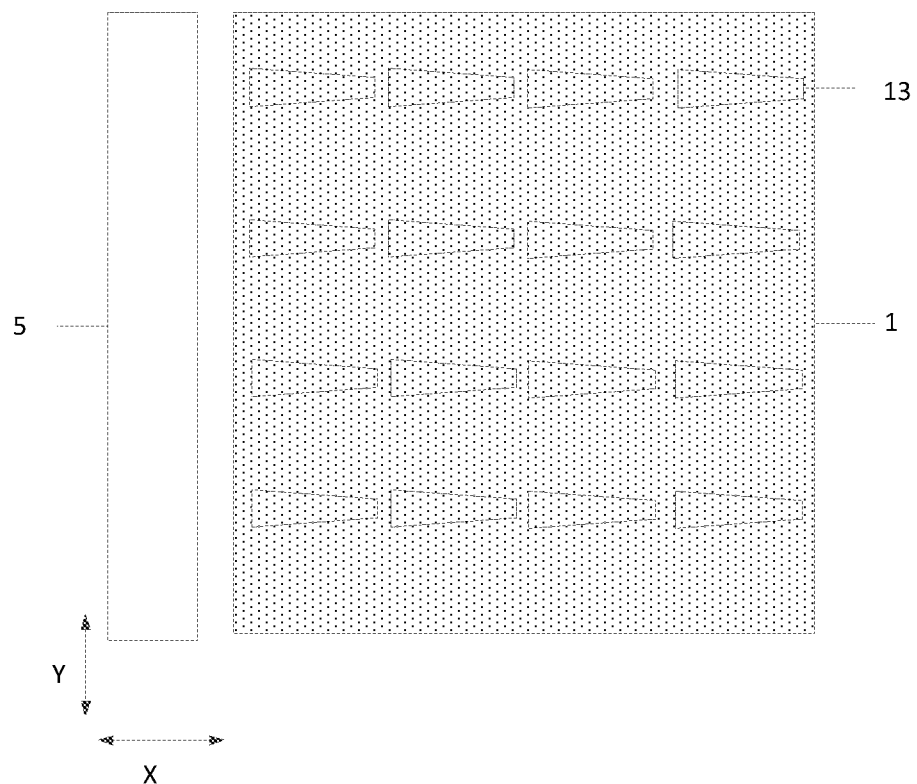
FIG. 2 is a top view of a second surface of a first light guide plate according to an embodiment of the present disclosure.

In some embodiments, as shown in FIG. 2, a shape of each first mesh point 13 is a wedge.

In some embodiments, as shown in FIG. 1, a surface on a side of the first reverse prism 6 close to the first light guide plate 1 includes: a plurality of continuously disposed first prism structures 16.

During specific implementation, as shown in FIG. 2, the plurality of first mesh points are arranged in arrays in a first direction Y and a second direction X. It should be noted that that the plurality of first mesh points are arranged in arrays in a first direction Y and a second direction X refers to that the plurality of first mesh points arranged in arrays may be divided into a plurality of first mesh point columns extending in the first direction Y and a plurality of first mesh point rows extending in the second direction X. In a direction in which the first light source 5 points at the first side surface 4, a width of each first mesh point 13 in the first direction Y gradually decreases, and a width of the first mesh point in the first direction Y is smaller than a width of the first mesh point in the second direction X. An arrangement direction of the plurality of first prism structures is the same as the direction in which the first light source pointing at the first side surface. That is, as shown in FIG. 1, in the second direction X, the first light source 5 is adjacent to the first side surface 4. The plurality of first prism structure 16 are arranged in the second direction X. That is, each first prism structure extends in the first direction Y In this case, when the first light source is driven to emit light, the light emitted from the first light source enters the first light guide plate through a light incident surface of the first light guide plate. With the design of the wedge-shaped first mesh points, the outgoing light of the first light guide plate enters the first reverse prism, is totally reflected via the first reverse prism, and is emitted, so that the first reverse prism can reduce beam angles in the first direction and the second direction, thereby increasing the brightness of the backlight module.

It should be noted that in FIG. 2, an example in which the backlight module includes only one first light source 5 is used for description. During specific implementation, a plurality of first light sources may be included. The plurality of first light sources are sequentially arranged in the first direction Y.

Certainly, during specific implementation, the backlight module may include only one second light source, or may include a plurality of second light sources.

Figure 3:
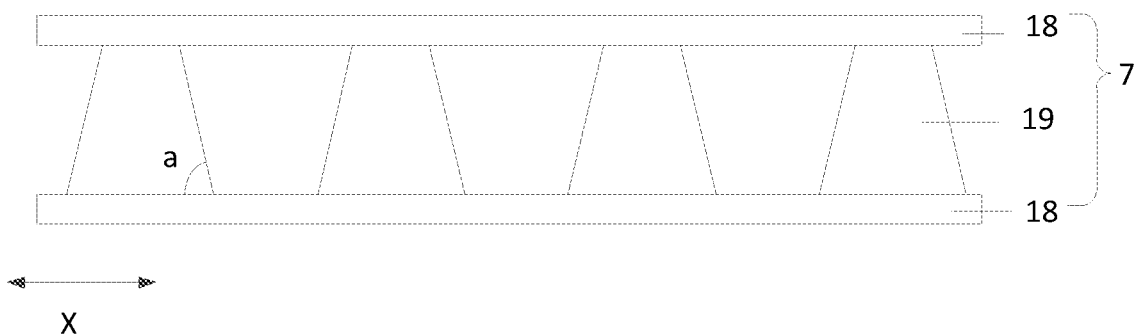
FIG. 3 is a schematic structural diagram of another backlight module according to an embodiment of the present disclosure.

In some embodiments, as shown in FIG. 3, the first privacy filter 7 includes two substrate material layers 18 that are disposed opposite and a plurality of trapezoid structures 19 located between the two substrate material layers 18. Two adjacent trapezoid structures 19 have a certain distance.

It should be noted that, the trapezoid structures include a light absorbing material. When a slope angle a of the trapezoid structures changes, a light exit direction and a light exit range of the first privacy filter change. In this case, the slope angle of the trapezoid structure may be designed to match a required light exit direction and light exit range.

In some embodiments, as shown in FIG. 3, the plurality of trapezoid structures 19 are arranged in the second direction X. Each trapezoid structure 19 extends in the first direction Y The first privacy filtering direction of the first privacy filter is the second direction X.

During specific implementation, for example, an angle of outgoing light of the first privacy filter is within ±24°. The light emission brightness of the first privacy filter, for example, satisfies L±24°/L0°<10%, where L±24° represents brightness within the angle of outgoing light of 24°, and L0° represents brightness at the angle of outgoing light being a vertical angle.

The function of the first reverse prism in the embodiments of the present disclosure is mainly to converge light from the first direction and the second direction, thereby increasing light emission brightness. The first privacy filter may block light at a preset angle, to enable the first reverse prism and the first privacy filter work together to form collimated light that satisfies a brightness requirement. Through tests, the backlight module provided in the embodiments of the present disclosure can satisfy that: in the first privacy filtering direction, an angle L±45°/L0° of outgoing light is approximately 0.4%, and L±35°/L0° is approximately 0.4%. L±45° represents brightness at the angle of outgoing light of ±45°, and L±35° represents brightness at the angle of outgoing light of 35°.

Figure 4:
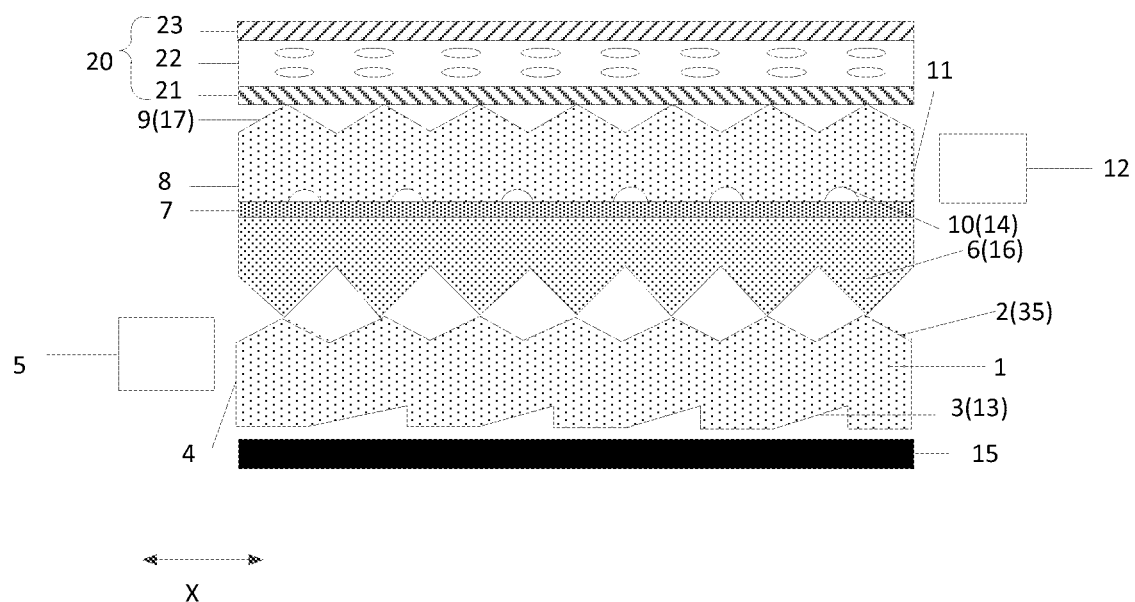
FIG. 4 is a schematic structural diagram of still another backlight module according to an embodiment of the present disclosure.

In some embodiments, as shown in FIG. 4, the backlight module further includes:
  a viewing angle control module 20, located on a side of the second light guide plate 8 away from the first privacy filter 7; and
  a first driving circuit (not shown), electrically connected to the viewing angle control module 20, and used to: provide an electric signal to the viewing angle control module 20, to enable a propagation direction of light that exits after passing through the viewing angle control module 20 to change.

During specific implementation, the first driving circuit provides an electric signal to the viewing angle control module. After light passes through the viewing angle control module and exits, the angle of the light is further reduced, so that a privacy filtering effect can be further improved. When the first driving circuit provides no electric signal to the viewing angle control module, after light passes through the viewing angle control module, a propagation direction of the light remains unchanged, so that the arrangement of the viewing angle control module does not affect normal display in the sharing state. That is, during specific implementation, in the privacy filtering state, the first light source is turned on, and the second light source is turned off. The first driving circuit provides an electric signal to the viewing angle control module. In the sharing state, the second light source is turned on, the first light source is turned off, and the first driving circuit does not need to provide an electric signal to the viewing angle control module, or both the second light source and the first light source may be turned on, and the first driving circuit does not need to provide an electric signal to the viewing angle control module.

Through tests, when the viewing angle control module is further disposed in the backlight module, the backlight module provided in the embodiments of the present disclosure can satisfy that: in the first privacy filtering direction, an angle of outgoing light L±45°/L0°<0.5%, and L±35°/L0°<0.75%. In this way, the first reverse prism, the first privacy filter, and the viewing angle control module work together to form collimated light that satisfies a brightness requirement.

In some embodiments, the viewing angle control module 20 includes: a first conductive layer 21, a first liquid crystal layer 22, and a second conductive layer 23 that are stacked. During specific implementation, the first conductive layer 21 and the second conductive layer 23 are electrically connected to the first driving circuit, and the first conductive layer 21 and the second conductive layer 23 are used to receive a driving electric signal. The first liquid crystal layer 22 is used to deflect under the control of the first conductive layer 21 and the second conductive layer 23, to change the propagation direction of light.

It should be noted that in the backlight module provided in the embodiments of the present disclosure, when the backlight module is applied to a display product, for example, as a backlight source of the display product, to implement switching between a privacy filtering state and a sharing state of the display product. During specific implementation, in the privacy filtering state, the first driving circuit provides a driving electric signal to the viewing angle control module, and after light passes through the viewing angle control module and exits, the angle of the light is further reduced. In the sharing state, it is not necessary to provide an electric signal to the viewing angle control module, after light passes through the viewing angle control module, the propagation direction of the light remains unchanged.

Figure 5:
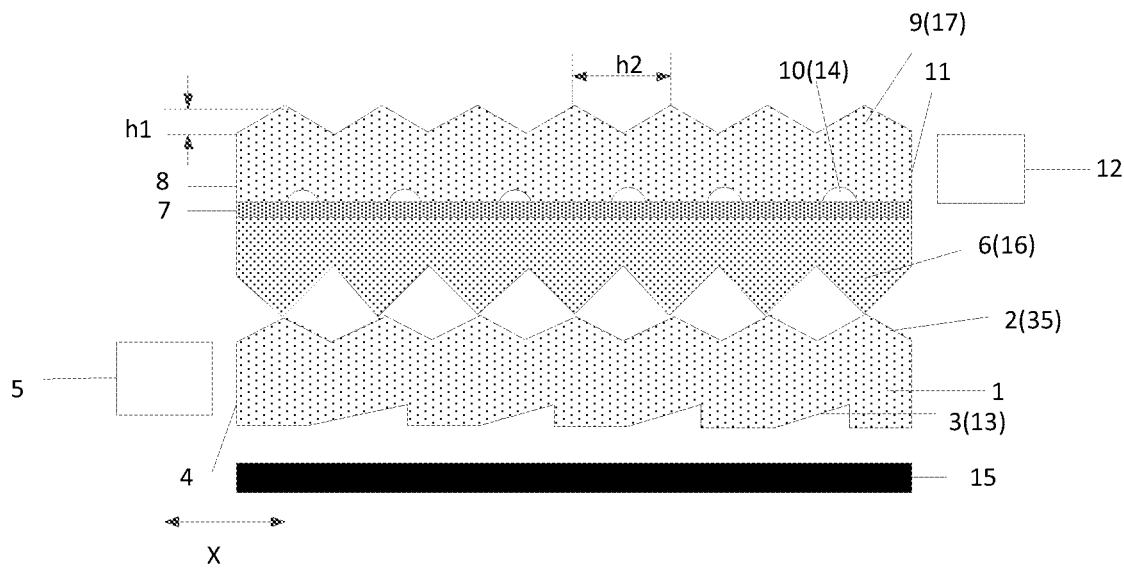
FIG. 5 is a schematic structural diagram of still another backlight module according to an embodiment of the present disclosure.

In some embodiments, as shown in FIG. 4 and FIG. 5, the third surface 9 includes a plurality of continuously arranged prism structures. To distinguish from the prism structure of a reverse prism, the prism structure included in the third surface is described as a second prism structure 17.

The second prism structure is included in the third surface, so that light emitted by the second light source can pass through the second light guide plate to exit at a large exit angle. When the backlight module is applied to a display product, a viewable area of the display product has a large angle, so that several people can view a display screen together, that is, a sharing state is implemented. That is, large-angle light emission can be implemented without additionally arranging a prism sheet, so that the thickness of the backlight module can be reduced, and the cost can be further reduced.

It should be noted that, in FIG. 4, an example in which the backlight module includes the viewing angle control module is used for description, and in FIG. 5, an example in which the backlight module does not include the viewing angle control module is used for description.

During specific implementation, a plurality of second prism structures are arranged in the second direction X, and each second prism structure 17 extends in the first direction Y.

In some embodiments, a height h1 of the second prism structure is greater than or equal to 5 micrometers and is less than or equal to 10 micrometers.

In some embodiments, a distance h2 between peaks of adjacent second prism structures is greater than or equal to 30 micrometers and is less than or equal to 70 micrometers.

Figure 6:
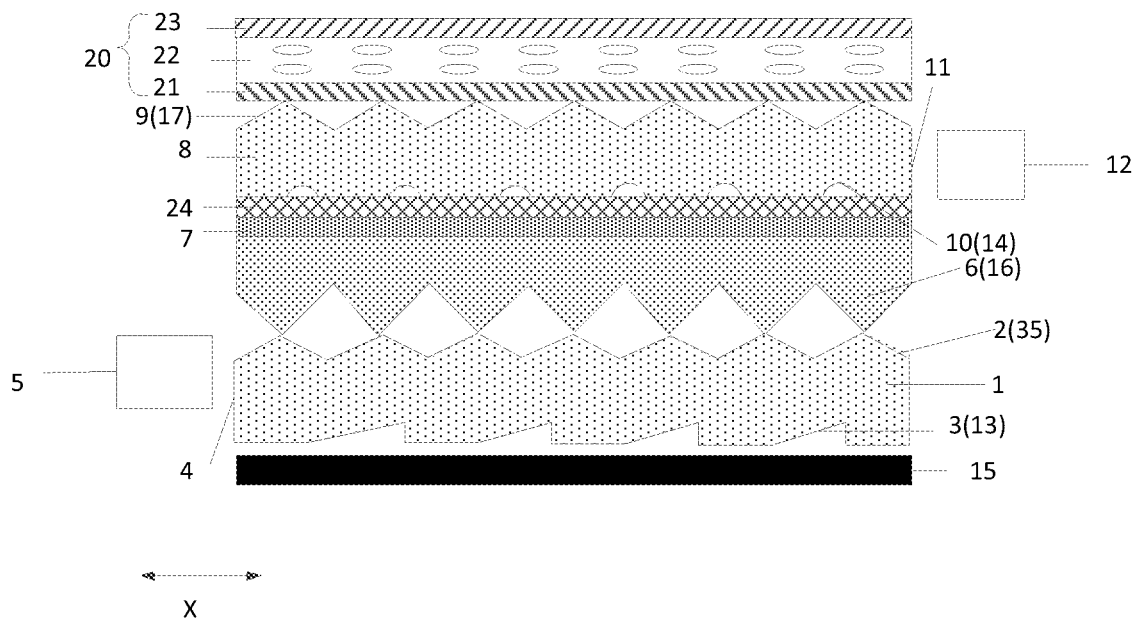
FIG. 6 is a schematic structural diagram of still another backlight module according to an embodiment of the present disclosure.

In some embodiments, as shown in FIG. 6, the backlight module further includes: a semi-transparent and semi-reflective film 24, located between the first privacy filter 7 and the second light guide plate 8.

In the backlight module provided in the embodiments of the present disclosure, the semi-transparent and semi-reflective film is added on a side of the second light guide plate close to the first privacy filter. The semi-transparent and semi-reflective film has a mirror surface effect, so that partial light can be reflected, thereby improving the light exit efficiency of the second light guide plate, and reducing the power consumption of the backlight module.

In some embodiments, the surface of the semi-transparent and semi-reflective film may be hardened, to prevent other film layers from scratching the semi-transparent and semi-reflective film to ensure the normal use of the semi-transparent and semi-reflective film.

In some embodiments, the semi-transparent and semi-reflective film is a polarizer film.

In the backlight module provided in the embodiments of the present disclosure, the semi-transparent and semi-reflective film is a polarizer film. That is, natural light passes through the semi-transparent and semi-reflective film and is converted into polarized light, thereby further improving the light utilization of the backlight module, and reducing the power consumption of the backlight module.

In some embodiments, as shown in FIG. 1, FIG. 4, FIG. 5, and FIG. 6, the shape of the second mesh points 14 is a circle.

Alternatively, the shape of the second mesh point may be an ellipse.

It should be noted that, during specific implementation, the plurality of second mesh points may also be arranged in arrays in the first direction Y and the second direction X. That the plurality of second mesh points are arranged in arrays in the first direction Y and the second direction X refers to that the plurality of second mesh points arranged in arrays may be divided into a plurality of second mesh point columns extending in the first direction Y and a plurality of second mesh point rows extending in the second direction X. During specific implementation, the size and distribution density of the first mesh points and the second mesh points may be adjusted according to an actual requirement.

In some embodiments, as shown in FIG. 1, FIG. 4, FIG. 5, and FIG. 6, the first light source 5 and the second light source 12 are respectively located on two sides of the first light guide plate 1.

Certainly, during specific implementation, the first light source and the second light source may be located on a same side of the first light guide plate.

Figure 7:
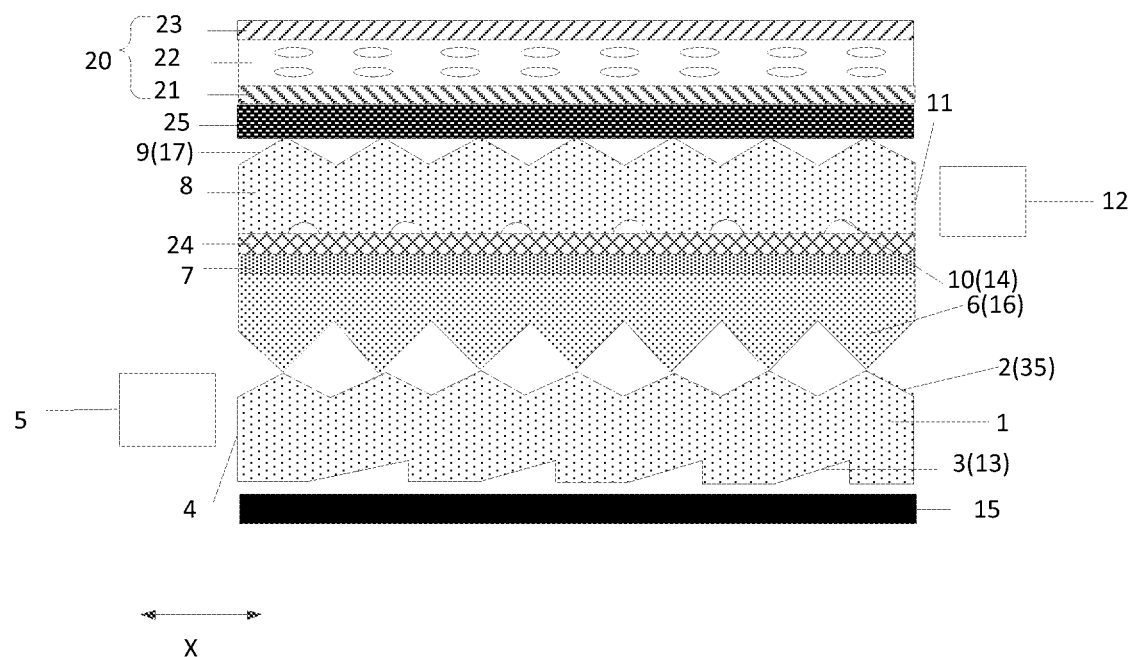
FIG. 7 is a schematic structural diagram of still another backlight module according to an embodiment of the present disclosure.

In some embodiments, as shown in FIG. 7, the backlight module further includes: a second privacy filter 25 located on a side of the second light guide plate 8 away from the first privacy filter 7, where the second privacy filter 25 has a second privacy filtering direction, and the second privacy filtering direction and the first privacy filtering direction intersect.

In the backlight module provided in the embodiments of the present disclosure, because the second privacy filter is disposed, privacy filtering in the first direction can be implemented in the sharing state, so that the backlight module has richer functions.

It should be noted that, the second privacy filter is used to implement that in the sharing state, light at a preset angle is blocked in the second privacy filtering direction, and collimated outgoing light is formed in the second privacy filtering direction. When the first privacy filtering direction is the second direction X, the second privacy filtering direction is the first direction Y.

In some embodiments, as shown in FIG. 7, a shape of each first mesh point is a circle or an ellipse.

In some embodiments, a width of the second light guide plate in the first direction is smaller than a width of the second light guide plate in the second direction; and the at least one second light source is adjacent to the second side surface in the second direction.

Correspondingly, during specific implementation, as shown in FIG. 7, at least one first light source 5 is adjacent to the first side surface 4 in the second direction X.

Through tests, when the second privacy filter is further disposed in the backlight module, the backlight module provided in the embodiments of the present disclosure can satisfy that in the second privacy filtering direction, an angle of outgoing light L±35°/L0°<1.6%.

Alternatively, another arrangement manner may be used to implement privacy filtering in the first direction in the sharing state. In some embodiments, as shown in FIG. 8, a shape of each second mesh point 14 is a wedge.

The backlight module further includes: a second reverse prism 26 located on the side of the second light guide plate 8 away from the first privacy filter 7.

In the backlight module provided in the embodiments of the present disclosure, because the second reverse prism is included and the shape of the second mesh point is a wedge, in the sharing state, the second reverse prism and the second light guide plate are used to implement privacy filtering in the first direction. In this way, privacy filtering in the first direction can be implemented without arranging a privacy filter, so that the light emission brightness of the backlight module can be increased while privacy filtering in the first direction is implemented, thereby reducing the power consumption of the backlight module.

Figure 8:
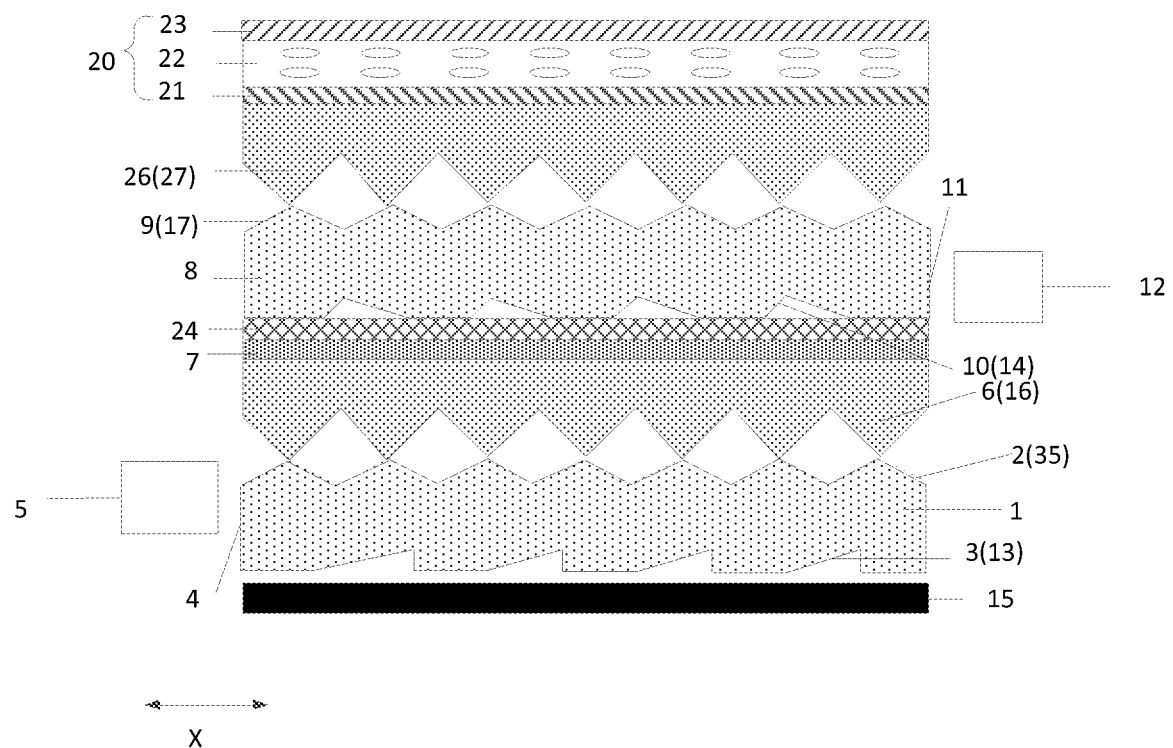
FIG. 8 is a schematic structural diagram of still another backlight module according to an embodiment of the present disclosure.

In some embodiments, as shown in FIG. 8, the second reverse prism 26 includes a plurality of continuously arranged third prism structures 27.

During specific implementation, in a direction in which the second light source points at the second side surface, a maximum width of the second mesh point is larger than a minimum width of the second mesh point in a direction perpendicular to the direction in which the second light source points at the second side surface, and in the direction in which the second light source points at the second side surface, the width of each second mesh point gradually decreases from one end to the other end. An arrangement direction of the plurality of third prism structures is the same as the direction in which the second light source points at the second side surface.

In some embodiments, when the first privacy filtering direction is the second direction X, a width of the second light guide plate in the first direction Y is larger than a width of the second light guide plate in the second direction X.

As shown in FIG. 8, at least one second light source 12 is adjacent to the second side surface 11 in the second direction X.

That is, the second light source is disposed opposite to a side surface corresponding to a long side of the second light guide plate. Specifically, as shown in FIG. 8, in the second direction X, the second light source 12 is adjacent to the second side surface 11. The plurality of third prism structures 27 are arranged in the second direction X. That is, each third prism structure extends in the first direction Y. In addition, as shown in FIG. 8, a minimum width h4 of the second mesh point 14 in the first direction Y is smaller than a maximum width h5 of the second mesh point 14 in the second direction X. A width of the second mesh point 14 in the second direction X gradually decreases from one end to the other end.

During specific implementation, when the long side of the second light guide plate is parallel to the first direction Y, the second light source is disposed opposite to the side surface corresponding to the long side of the second light guide plate. The third prism structure extends in the first direction Y. In this case, the second light guide plate and the second reverse prism are combined to implement privacy filtering in the first direction in the sharing state. When the second light source is driven to emit light, because the light emitted from the second light source enters the second light guide plate from a light incident surface of the second light guide plate. With the design of the wedge-shaped second mesh points, the outgoing light of the second light guide plate enters the second reverse prism, is totally reflected in the second reverse prism, and is emitted, so that the first reverse prism can reduce beam angles in the first direction and the second direction. An extension direction of the third prism structure is parallel to a direction of the long side of the second light guide plate. Therefore, a beam converge degree in the first direction is higher, so that privacy filtering can be implemented in the first direction in the sharing state.

In some embodiments, when the first privacy filtering direction is the second direction X, a width of the first light guide plate in the first direction Y is larger than a width of the first light guide plate in the second direction X. As shown in FIG. 8, at least one first light source 5 is adjacent to the first side surface 4 in the second direction X. That is, the first light source is disposed opposite a side surface corresponding to the long side of the first light guide plate.

In the backlight module provided in the embodiments of the present disclosure, the first light source and the second light source are both disposed opposite to a side surface corresponding to a long side of a light guide plate. When a plurality of first light sources and a plurality of second light sources need to be disposed, there is large space on the side surface corresponding to the long side of the light guide plate, and more light sources can be disposed, so that while privacy filtering is implemented in the first direction in the sharing state, an arrangement quantity of light sources of the backlight module can be further increased, thereby improving the brightness of the backlight module.

In some embodiments, as shown in FIG. 8, the first light source 5 and the second light source 12 are respectively located on two sides of the first light guide plate 1.

Certainly, during specific implementation, the first light source and the second light source may be located on a same side of the first light guide plate.

It should be noted that, in FIG. 8, an example in which the first light source and the second light source are both disposed opposite to a side surface corresponding to a long side of a light guide plate is used for description. During specific implementation, when privacy filtering needs to be implemented in the first direction in the sharing state, the first light source may be disposed opposite to a side surface corresponding to a short side of the first light guide plate. In this case, when the first privacy filtering direction is the second direction X, a width of the light guide plate in the first direction Y is larger than a width of the light guide plate in the second direction X, the second light source is still adjacent to the second side surface in the second direction, each third prism structure extends in the first direction Y, the first light source is adjacent to the first side surface in first direction, and an extension direction of the first prism structure is perpendicular to the extension direction of the third prism structure, that is, each first prism structure extends in the second direction.

During specific implementation, when the shape of the first mesh point and the shape of the second mesh point are both wedges, specific shapes of the wedge may be the same or may be different. For example, the first mesh point and the second mesh point have different shapes in FIG. 8. A cross-sectional shape of the first mesh point is a right triangle, and a cross-sectional shape of the second mesh point is a non-right triangle.

In some embodiments, a cross-sectional pattern of the second mesh point in the first direction is an isosceles trapezoid; and a cross-sectional pattern of the second mesh point in the second direction is a non-right, non-isosceles triangle.

Figure 9:
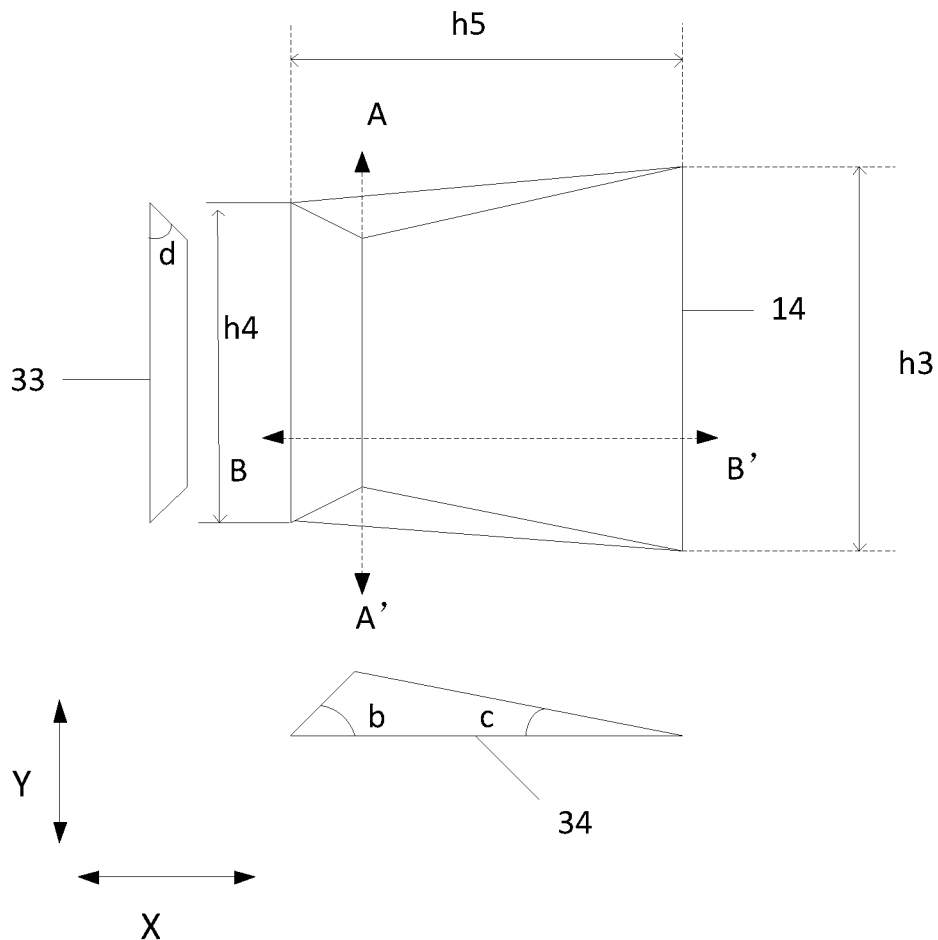
FIG. 9 is a schematic structural diagram of a second mesh point according to an embodiment of the present disclosure.

For example, FIG. 9 is a top view of the second mesh point. FIG. 9 further schematically shows a cross-sectional pattern 33 along AA' and a cross-sectional pattern 34 along BB' of the second mesh points 14. The cross-sectional pattern 33 along AA' is a cross-sectional pattern of the second mesh points 14 in the first direction Y, and the cross-sectional pattern 34 along BB' is a cross-sectional pattern of the second mesh points 14 in the second direction X. As shown in FIG. 9, the cross-sectional pattern 33 along AA' is an isosceles trapezoid, and the cross-sectional pattern 34 along BB' is a non-right, non-isosceles triangle. During specific implementation, a maximum width h3 of the second mesh points 14 in the first direction Y may be equal to a width h5 of the second mesh points 14 in the second direction X. For example, h5=h3=50 micrometers. An angle d in the cross-sectional pattern 33 along AA' is, for example, 60°. In the cross-sectional pattern 34 along BB', an angle b is 60°, and an angle c is 3°.

In some embodiments, as shown in FIG. 1 and FIG. 4 to FIG. 8, the first surface 2 includes a plurality of continuously arranged fourth prism structures 35. In this way, a lower surface of the first reverse prism can be kept from contacting the first surface and scratching the first surface.

Correspondingly, when the third surface of the second light guide plate includes the second prism structures, in addition to that a prism film can be omitted, a lower surface of the second reverse prism can be further kept from contacting the third surface and scratching the third surface.

During specific implementation, as shown in FIG. 1 and FIG. 4 to FIG. 8, the plurality of fourth prism structures 35 are arranged in the second direction X.

During specific implementation, a height of the fourth prism structure is greater than or equal to 5 micrometers and is less than or equal to 10 micrometers. A distance between peaks of adjacent fourth prism structures is greater than or equal to 30 micrometers and is less than or equal to 70 micrometers. The height of the fourth prism structure may be the same as the height of the second prism structure, and the distance between peaks of adjacent fourth prism structures may be the same as a distance between peaks of adjacent second prism structures. Certainly, the height of the fourth prism structure may be not the same as the height of the second prism structure, and the distance between peaks of adjacent fourth prism structures is not the same as the distance between peaks of adjacent second prism structures.

Figure 10:
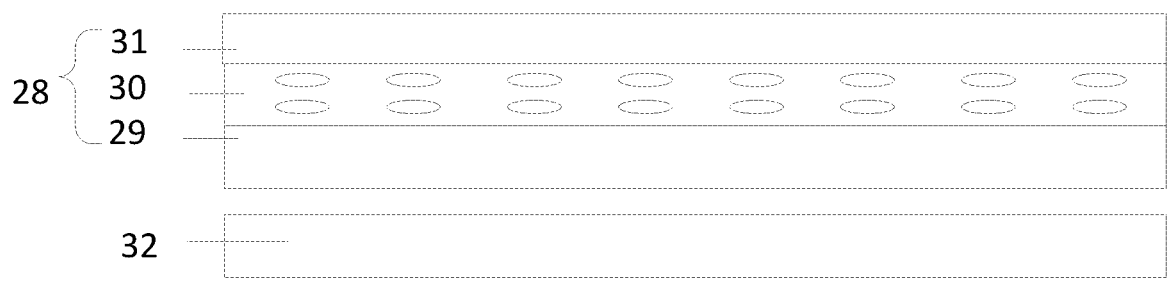
FIG. 10 is a schematic structural diagram of the display device according to an embodiment of the present disclosure.

An embodiment of the present disclosure provides a display device. As shown in FIG. 10, the display device includes: the backlight module 32 provided in the foregoing embodiment of the present disclosure; and a display panel 28, located on a light exit side of the backlight module 32.

During specific implementation, as shown in FIG. 10, the display panel 28 is, for example, a liquid crystal display panel, including: an array substrate 29 and an opposite substrate 31 that are disposed opposite, and a second liquid crystal layer 30 located between the array substrate 29 and the opposite substrate 31. The array substrate 29 includes: thin-film transistors and pixel electrodes arranged in arrays. The opposite substrate includes: a color resist and a black matrix. The black matrix has an opening area corresponding to a sub-pixel area of the display panel. The color resist is located in the opening area. The array substrate or the opposite substrate further includes a common electrode.

During specific implementation, the display device provided in the embodiments of the present disclosure may be, for example, applied to a vehicle as an in-vehicle display device.

The display apparatus provided in the embodiments of the present disclosure is a mobile phone, a tablet computer, a television, a display, a notebook computer, a digital frame, a navigator or any other product or component having a display function. Other essential components of the display device should be understood by a person of ordinary skill in the art, and details are not described again herein, nor should they be used as a limitation of the present disclosure. The implementation of the display device can be seen in the above embodiment of the backlight module, and details are not described again.

In summary, in the backlight module provided in the embodiments of the present disclosure, the first reverse prism is located on a light exit surface of the first light guide plate, so that outgoing light of the first light guide plate may be converged to form collimated outgoing light. The first privacy filter is disposed on the side of the first reverse prism away from the first light guide plate. After collimated light enters the first privacy filter, the first privacy filter may block light at the preset angle in the first privacy filtering direction, thereby further narrowing down an angle of outgoing light, to form collimated outgoing light. When the backlight module is applied to a display product, the display product can implement privacy filtering in the first privacy filtering direction, and can improve a privacy filtering effect. In addition, because the first reverse prism may converge light that exits the first light guide plate, the light emission brightness in a vertical viewing angle can be further improved, thereby reducing a loss in light emission brightness due to the arrangement of the first privacy filter, and avoiding an increase in the power consumption of the backlight module.

Although preferred embodiments of the present invention are described, once acquiring basic innovative concepts, a person skilled in the art may make other changes and modifications to these embodiments. Therefore, the appended claims intend to be explained to include preferred embodiments and all changes and modifications that fall within the scope of the present invention.

Obviously, persons skilled in the art can make various modifications and variations to the embodiments of the present invention without departing from the spirit and scope of the embodiments of the present invention. In this way, if these modifications and variations to the embodiments of the present invention fall within the scope of claims of the present invention and equivalent technologies thereof, the present invention also intends to cover these modifications and variations.

What is claimed is:

1. A backlight module, comprising:
   a first light guide plate, comprising: a first surface and a second surface that are opposite, and a first side surface connecting the first surface and the second surface, wherein the second surface comprises a plurality of first mesh points arranged in arrays;
   at least one first light source, adjacent to the first side surface;
   a first reverse prism, located on a side of the first surface away from the second surface;
   a first privacy filter, located on a side of the first reverse prism away from the first light guide plate, wherein the first privacy filter has a first privacy filtering direction, and the first privacy filter is used to block light at a preset angle in the first privacy filtering direction for collimated incident light;
   a second light guide plate, located on a side of the first privacy filter away from the first reverse prism, and comprising: a third surface and a fourth surface that are opposite, and a second side surface connecting the third surface and the fourth surface, wherein the third surface is located on a side of the fourth surface away from the first privacy filter, and the fourth surface comprises a plurality of second mesh points arranged in arrays; and
   at least one second light source, adjacent to the second side surface.

2. The backlight module according to claim 1, further comprising:
   a viewing angle control module, located on a side of the second light guide plate away from the first privacy filter; and
   a first driving circuit, electrically connected to the viewing angle control module, and used to: provide an electric signal to the viewing angle control module, to enable a propagation direction of light that exits after passing through the viewing angle control module to change.

3. The backlight module according to claim 2, wherein the viewing angle control module comprises: a first conductive layer, a first liquid crystal layer, and a second conductive layer that are stacked.

4. The backlight module according to claim 1, wherein the third surface comprises a plurality of continuously arranged prism structures.

5. The backlight module according to claim 1, further comprising:
   a semi-transparent and semi-reflective film, located between the first privacy filter and the second light guide plate.

6. The backlight module according to claim 5, wherein the semi-transparent and semi-reflective film is a polarizer film.

7. The backlight module according to claim 1, further comprising: a second privacy filter located on the side of the second light guide plate away from the first privacy filter, wherein the second privacy filter has a second privacy filtering direction, and the second privacy filtering direction and the first privacy filtering direction intersect.

8. The backlight module according to claim 7, wherein the plurality of second mesh points are arranged in arrays in a first direction and a second direction; the first direction and the second direction intersect; and
   a shape of each second mesh point is a circle or an ellipse.

9. The backlight module according to claim 8, wherein a width of the second light guide plate in the first direction is larger than a width of the second light guide plate in the second direction; and the at least one second light source is adjacent to the second side surface in the second direction.

10. The backlight module according to claim 1, wherein the plurality of second mesh points are arranged in arrays in a first direction and a second direction; the first direction and the second direction intersect; and
    a shape of each second mesh point is a wedge; and
    the backlight module further comprises: a second reverse prism located on the side of the second light guide plate away from the first privacy filter.

11. The backlight module according to claim 10, wherein the first privacy filtering direction is the second direction;
    a width of the second light guide plate in the first direction is larger than a width of the second light guide plate in the second direction; and
    the at least one second light source is adjacent to the second side surface in the second direction.

12. The backlight module according to claim 11, wherein a cross-sectional pattern of the second mesh point in the first direction is an isosceles trapezoid; and a cross-sectional pattern of the second mesh point in the second direction is a non-right non-isosceles triangle.

13. The backlight module according to claim 1, wherein a shape of each first mesh point is a wedge.

14. The backlight module according to claim 13, wherein the first light source and the second light source are located on a same side of the first light guide plate, or the first light source and the second light source are respectively located on two sides of the first light guide plate.

15. The backlight module according to claim 1, further comprising:
    a reflective sheet, located on a side of the second surface away from the first surface.

16. A display device, comprising:
    a backlight module; and
    a display panel, located on a light exit side of the backlight module;
    wherein the backlight module comprises:
    a first light guide plate, comprising: a first surface and a second surface that are opposite, and a first side surface connecting the first surface and the second surface, wherein the second surface comprises a plurality of first mesh points arranged in arrays;
    at least one first light source, adjacent to the first side surface;
    a first reverse prism, located on a side of the first surface away from the second surface;
    a first privacy filter, located on a side of the first reverse prism away from the first light guide plate, wherein the first privacy filter has a first privacy filtering direction, and the first privacy filter is used to block light at a preset angle in the first privacy filtering direction for collimated incident light;
    a second light guide plate, located on a side of the first privacy filter away from the first reverse prism, and comprising: a third surface and a fourth surface that are opposite, and a second side surface connecting the third surface and the fourth surface, wherein the third surface is located on a side of the fourth surface away from the first privacy filter, and the fourth surface comprises a plurality of second mesh points arranged in arrays; and at least one second light source, adjacent to the second side surface.

17. The display device according to claim 16, wherein the backlight module further comprises:
   a viewing angle control module, located on a side of the second light guide plate away from the first privacy filter; and
   a first driving circuit, electrically connected to the viewing angle control module, and used to: provide an electric signal to the viewing angle control module, to enable a propagation direction of light that exits after passing through the viewing angle control module to change.

18. The display device according to claim 17, wherein the viewing angle control module comprises: a first conductive layer, a first liquid crystal layer, and a second conductive layer that are stacked.

19. The display device according to claim 16, wherein the third surface comprises a plurality of continuously arranged prism structures.

20. The display device according to claim 16, wherein the backlight module further comprises:
   a semi-transparent and semi-reflective film, located between the first privacy filter and the second light guide plate.

\* \* \* \* \*